March 5, 1963  R. J. FIBIKAR ETAL  3,079,802
APPARATUS FOR BALANCING ENGINES
Filed April 8, 1957  5 Sheets-Sheet 1

INVENTORS:
Werner I. Senger
Robert J. Fibikar
BY
ATTORNEYS.

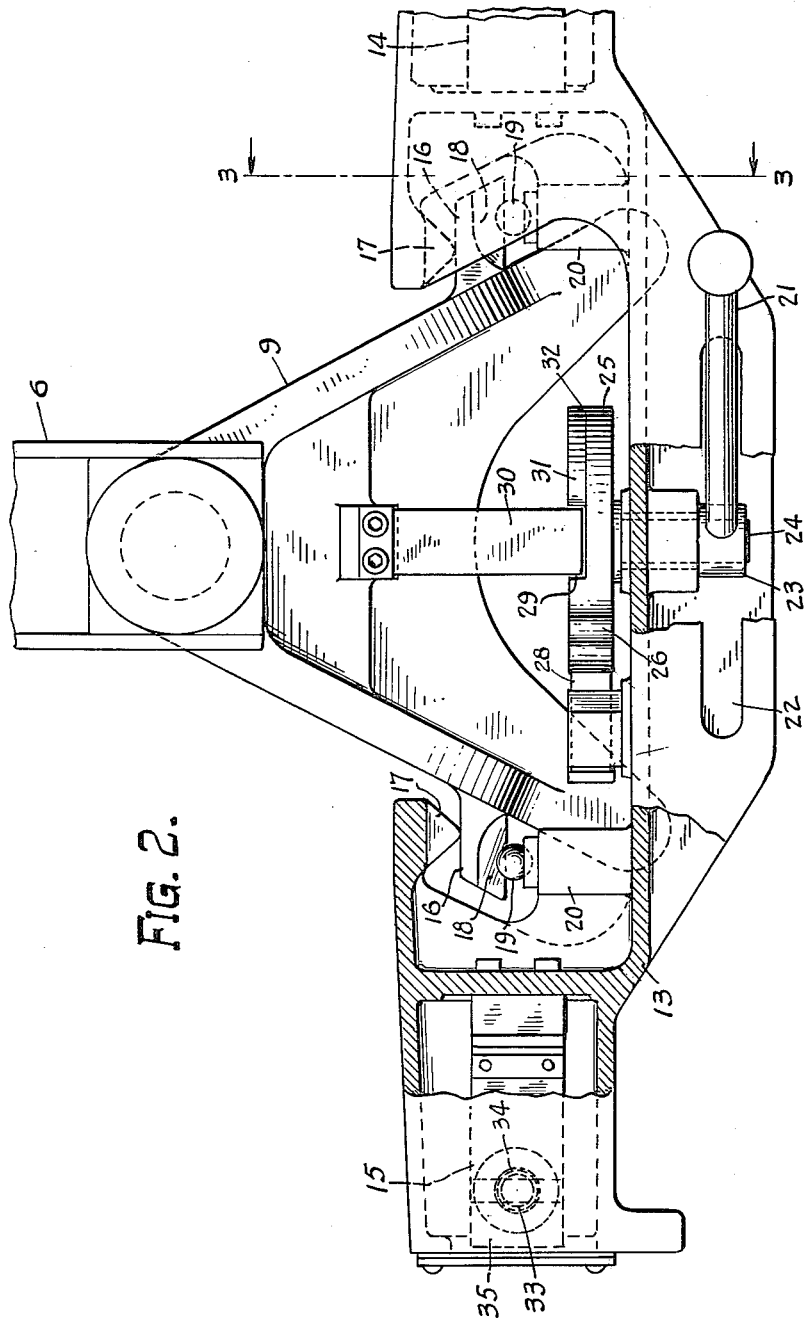

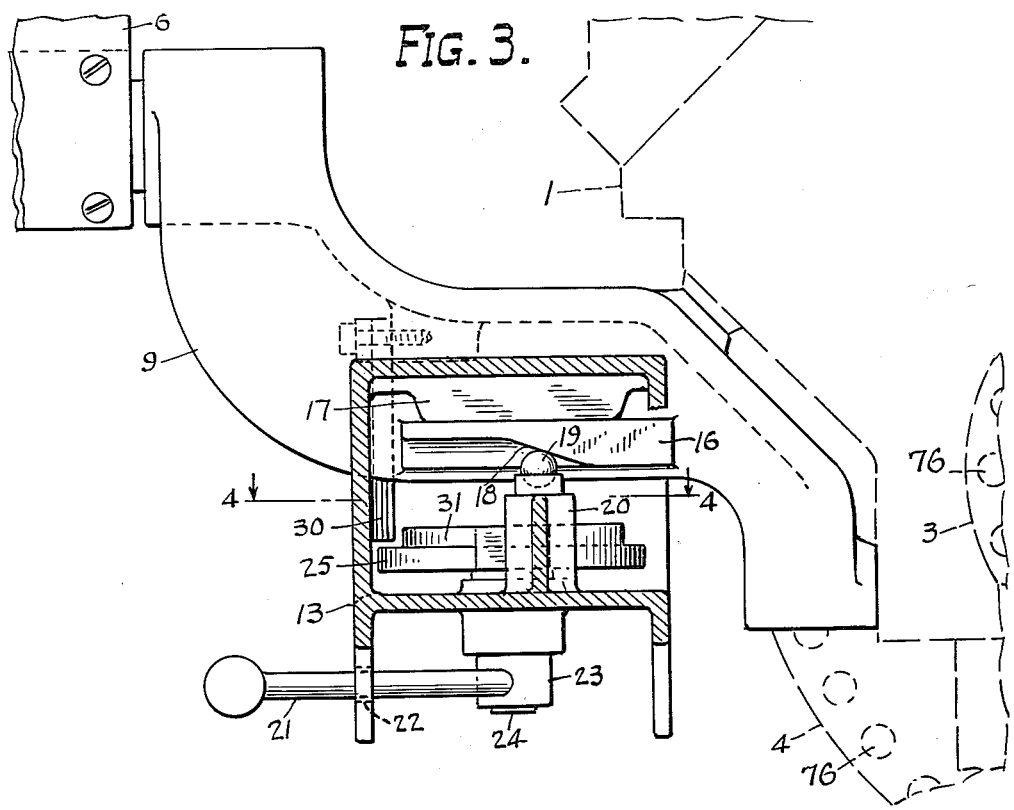
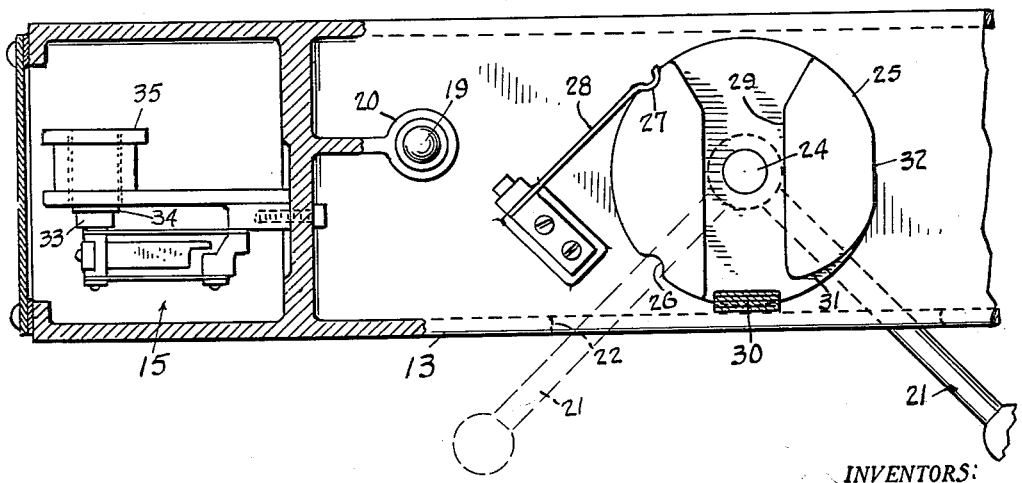

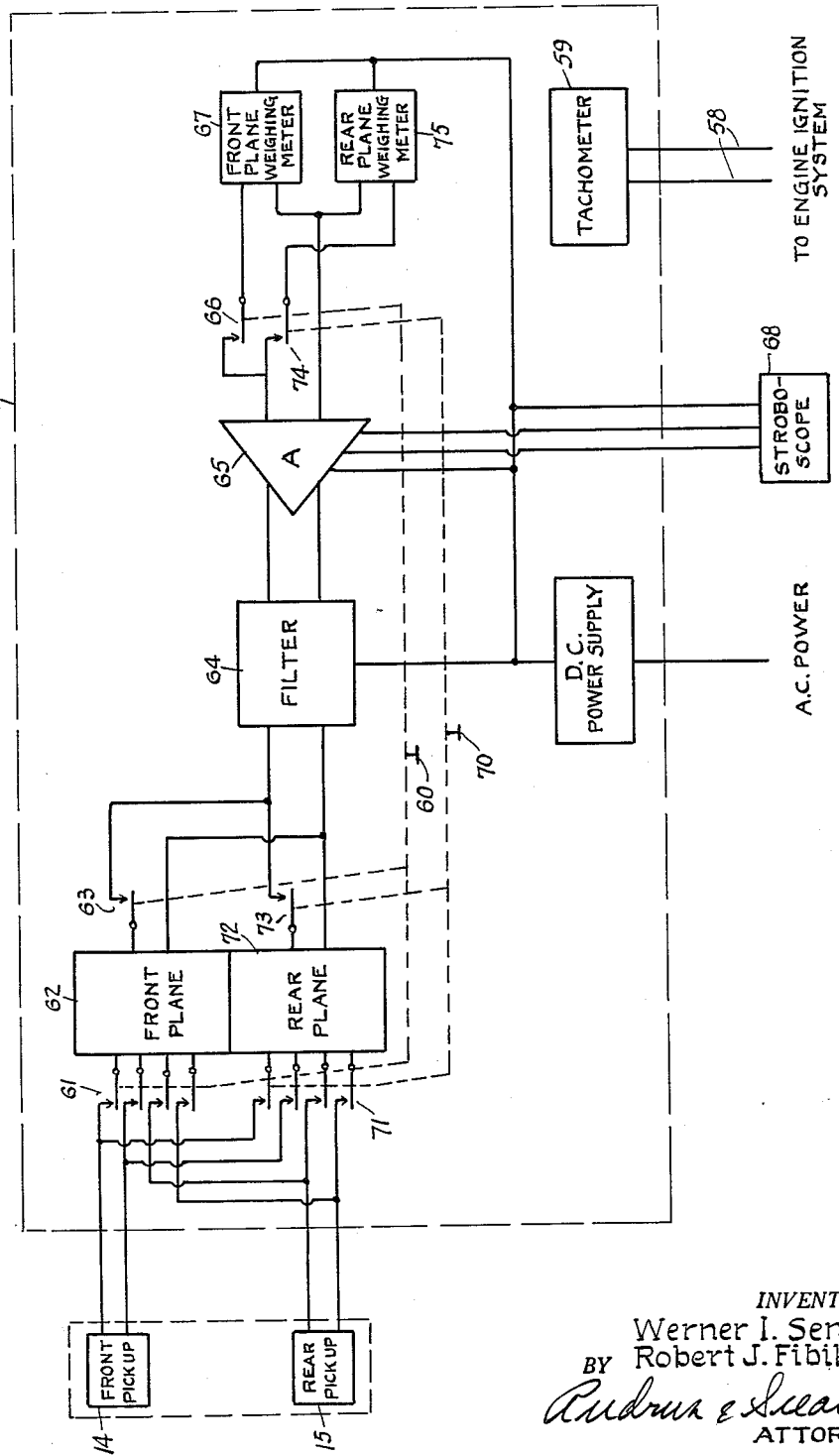

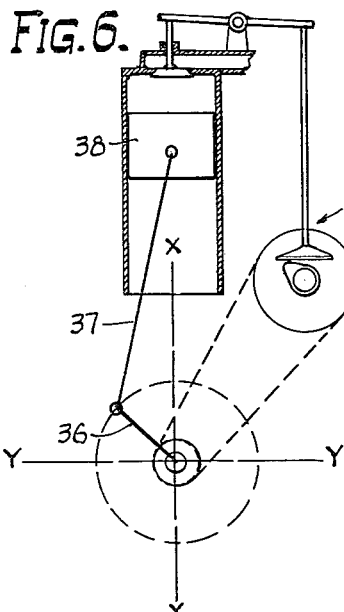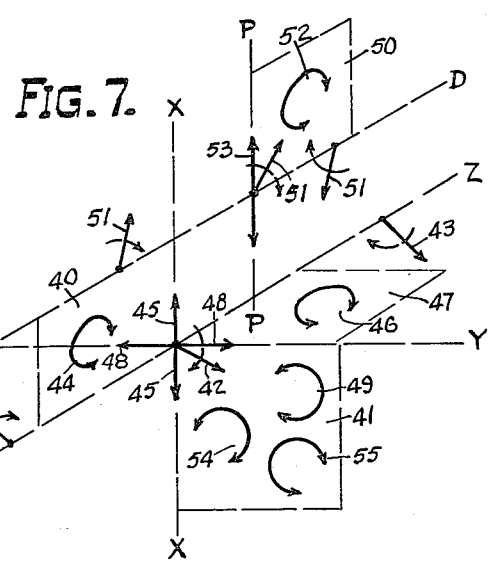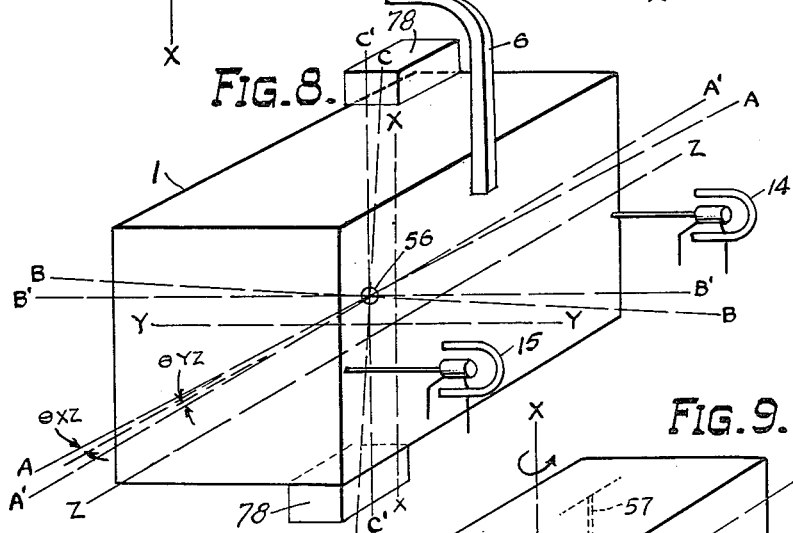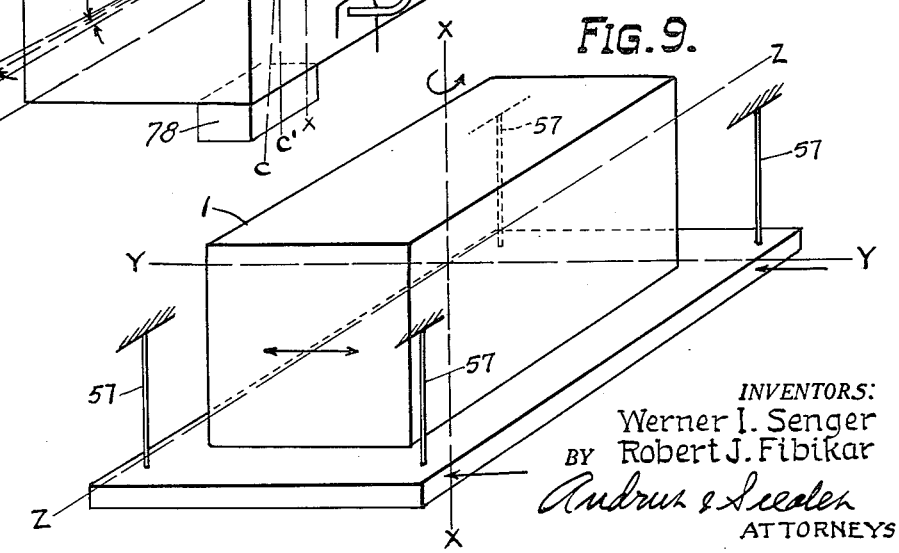

United States Patent Office 3,079,802
Patented Mar. 5, 1963

3,079,802
APPARATUS FOR BALANCING ENGINES
Robert J. Fibikar and Werner I. Senger, Madison, Wis., assignors to Gisholt Machine Company, Madison, Wis., a corporation of Wisconsin
Filed Apr. 8, 1957, Ser. No. 651,406
1 Claim. (Cl. 73—466)

This invention relates to apparatus for balancing engines utilizing the combustion of hydrocarbon fuels where the rotary parts require balancing under service conditions.

Heretofore it has been the general practice to balance the various rotary parts of an engine, such as the crankshaft and flywheel separately and prior to assembly at the factory. Repair shops could not afford the required balancing machines for this purpose.

The present invention is believed to be the first to provide practical means of balancing the rotary parts of an assembled and operative engine. The unbalance measuring is accomplished while the engine is operating under its own power at a normal operating speed.

The invention has been applied to the balancing of the rotary parts of internal combustion automobile engines at their test station where they are operated for test purposes before being assembled in automobiles. It may be applied as well at any time or place, as for instance in a repair garage.

The invention is also applicable to the balancing of engines other than automobile engines.

The balancing correction is applied by the operator immediately following the determination of unbalance, after which the engine may be again operated and any remaining unbalance determined to assure that unbalance is within tolerance limits for unbalance, before dismantling the balance testing equipment from the engine.

In the embodiment illustrated herein the engines, as they come from the final assembly and inspection line in a factory, are individually seismically hanging from an overhead conveyor system along which they are moved in succession and usually intermittently. Each engine is started and operated for a given run-in test period of much longer time than that necessary for balance testing. A similar suspending of an engine from an overhead block and tackle may be provided in a repair shop.

Where the engine is suspended universally from a single hanger, the pick-ups are positioned relative to the neutral axis and constructed to mechanically avoid the pick-up of torque inertia oscillations about the longitudinal neutral or inertia axis, and to avoid picking up vertical and axial vibrations.

Where the engine is mounted seismically by means that provide rigidity against such extraneous torque inertia oscillations and vertical and axial vibrations, the pick-ups may be positioned relative to the rotary parts and without regard to the neutral axis.

At some time during this test period each engine has secured to it certain unbalance vibration pickup equipment which is electrically connected to a control panel that indicates the speed of the engine and the unbalance in each of two longitudinally separated planes transverse to the axis of rotation of the crankshaft.

For the engine illustrated, one correction plane coincides substantially with the fan belt wheel at the front end of the engine crankshaft, and the other correction plane coincides substantially with the flywheel at the rear end of the engine crankshaft.

The operator notes the unbalance indicated as related to each of the correction planes and after stopping the engine, he makes the necessary corrections for each plane by either removing metal or adding a metallic plug of given weight at the proper angular location in the belt wheel and in the flywheel.

The accompanying drawings illustrate an embodiment of the invention described more specifically hereinafter and which constitutes the best mode presently contemplated of carrying out the invention.

In the drawings:

FIG. 2 is an enlarged detail front elevation partly in section of the pickup support and hanger;

FIG. 3 is a section taken on line 3—3 of FIG. 2;

FIG. 4 is a section taken on line 4—4 of FIG. 3 showing the manual clamp and one of the pickups in plan view;

FIG. 5 is a block diagram of the electrical apparatus employed for determining the amount and angle of unbalance for the separate correction planes;

FIG. 6 is a diagram of a simple internal-combustion engine system;

Figure 1:
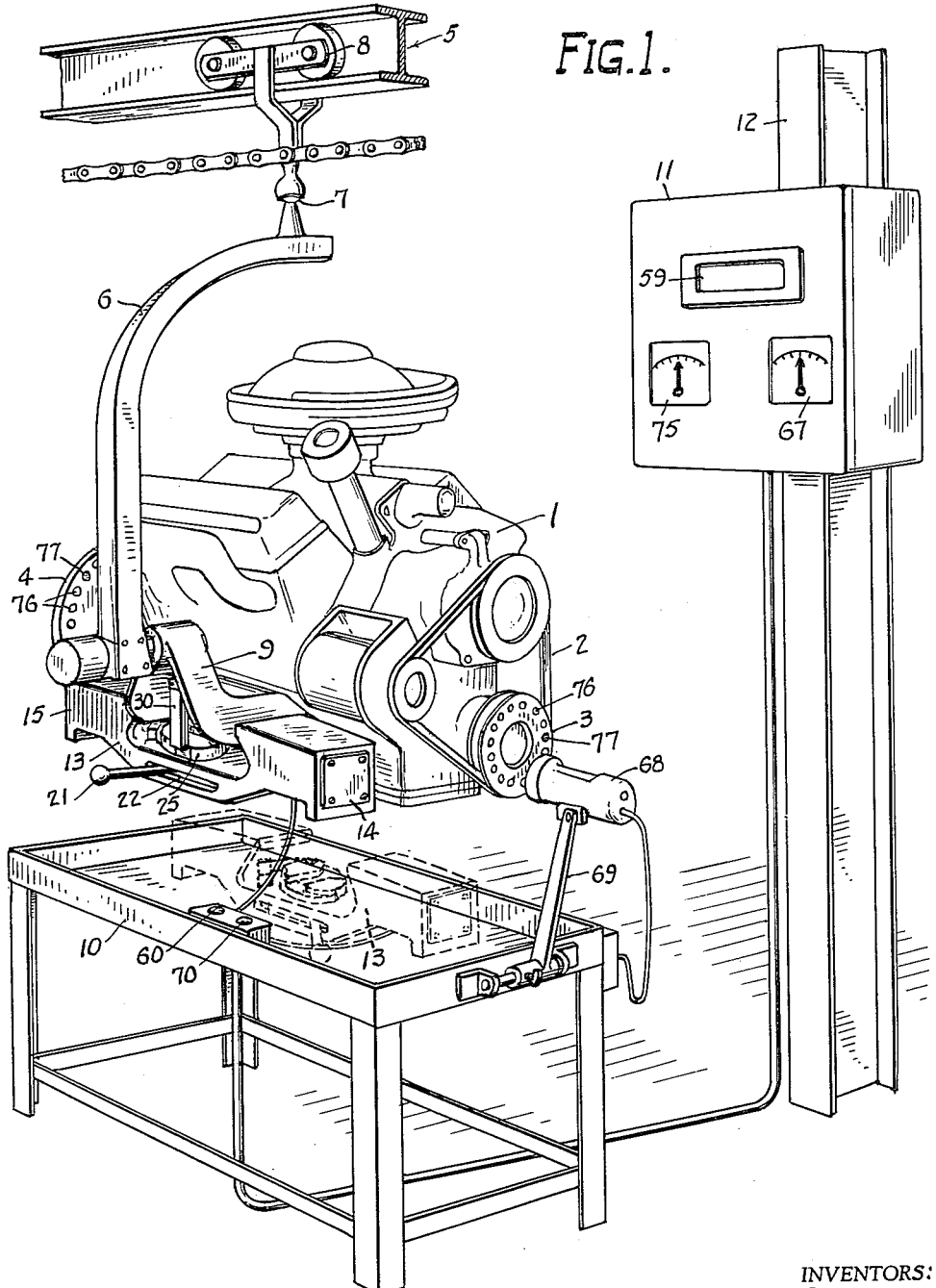
FIGURE 1 is a perspective view showing an engine at the balancing station with cover removed to show the position of one pick-up.

FIG. 7 is a diagram showing the vibration forces and couples present in a multi-cylinder engine system FIG. 8 is a schematic illustration of the relationship of the various types of vibrations involved when the engine of FIG. 7 is seismically suspended as illustrated in FIGS. 1 and 3; and FIG. 9 is a similar schematic illustration showing the use of a support that is rigid except for the direction of unbalance vibrations effecting the pick-ups.

The engine 1, illustrated to be balanced, is of the usual V-8 automobile type with a fan belt 2 driven by a fan belt wheel 3 on the front end of the engine crankshaft, and a flywheel 4 on the rear end of the engine crankshaft.

The engine 1 is suspended freely from an overhead conveyor 5 by means of a carrier 6 and a suitable connection 7 from a conveyor truck 8 on the conveyor 5. The suspension provides a seismic mounting for the engine.

The carrier 6 is like a goose neck, curved outwardly and downwardly from connection 7 to a transverse inverted V-shaped hanger 9 which has its lower arms extending beneath the engine and suitably secured thereto so that the center of gravity of the engine is approximately vertically beneath the universal connection 7.

The balancing equipment may be initially supported at the balancing station by a table 10 or other suitable means at a location directly beneath the engine 1 when it is moved into position at the station. A cabinet 11 is mounted on a post 12 adjacent to the station to house additional parts of the balancing equipment.

The balancing equipment on table 10 comprises a frame 13 adapted to be lifted from the table 10 and clamped to the hanger 9 by the operator.

The frame 13 is adapted to extend lengthwise of the engine 1 beneath the front portion of hanger 9, and carries a forward vibration pickup 14 adjacent the forward end of the engine and a rear vibration pickup 15 adjacent the rear end of the engine.

The frame 13 is made of lightweight metal such as cast aluminum and may be clamped to hanger 9 in any suitable manner, or suitably secured directly to the engine 1.

In the construction illustrated, each of the lower side arms of hanger 9 has a horizontal flat top bar 16 welded to the outer side thereof and projecting laterally outwardly therefrom.

The central portion of frame 13 is recessed downwardly to be disposed beneath the hanger 9. The frame 13 has a pair of downwardly facing generally rounded supporting lugs 17, each being adapted to rest on the flat top of a corresponding bar 16 when the frame 13 is slid in place by the operator.

The underside of each bar 16 is provided with a slanting or inclined surface 18 against which a ball 19, supported in a recess post 20 on frame 13, is pressed when the frame is clamped in position.

The clamping of frame 13 is shown as effected by a hand lever 21 which has two positions, one being the clamp position and the other being the unclamp position.

The lever 21 extends to the front of frame 13 through a slot 22 therein, and is secured to a collar 23 on a vertical shaft 24 mounted in the bottom of the frame.

The upper end of shaft 24 has a clamp wheel 25 secured thereto to be turned by movement of lever 21.

The outer periphery of wheel 25 has two notches 26 and 27 approximately 90° apart, to receive a spring detent 28 suitable carried by the frame 13, and which detent normally and alternately secures the wheel 25 and lever 21 in clamp position when engaged in notch 26 and in unclamp position when engaged in notch 27.

The upper face of wheel 25 has a diametric slot 29 therein, which extends transverse to frame 13 when the wheel is in unclamp position and longitudinally of frame 13 when the wheel is in clamp position. The rear end of slot 29 is widened to facilitate entry and passage through the slot of the lower end of a strong laminated clamp spring 30 when the operator slides the frame 13 in place on a hanger 9.

The hanger 9 carries a strong laminated clamp spring 30 depending from the center of the hanger.

When the frame 13 is in place the lower end of spring 30 is in the front end of slot 29. The periphery of wheel 25 on one side of slot 29 is recessed to provide a cam surface 31 which engages spring 30 as the wheel is turned to clamp position so that the frame 13 is urged inwardly with balls 19 riding against slant surfaces 18 and pulling lugs 17 downwardly tight on bar 16.

A flat 32 is provided on the periphery of wheel 25 for engaging spring 30 when the wheel has reached the fully clamped position and detent 28 has entered notch 26.

The vibration pickups 14 and 15 are of the electromagnetic transducer type wherein unbalance vibrations in a given horizontal plane of the engine effect a corresponding vibration of an armature 33 carrying a coil 34 disposed between opposite poles of a permanent magnet 35.

Movement of the turns of coil 34 in a direction to cut magnetic lines of force between the poles of magnet 35, generates an electrical potential which is then amplified and measured to determine the amount of unbalance, and the phase is determined to indicate the angular relation of the unbalance.

The apparatus illustrated is constructed to provide for plane separation, and employs networks to modify the electrical pulses, as shown more specifically in the Baker Patent No. 2,165,024. Other means such as a nodal bar may be employed to provide plane separation.

Where the engine is of the internal combustion type employing cylinders and pistons, there are a number of characteristic vibrations from sources other than unbalance of the rotating parts and which need to be filtered out either mechanically or electrically in order to obtain accurate balancing of the engine.

As illustrated in FIG. 6, the system of such an engine embraces a rotating crank 36, a connecting rod 37 and a reciprocating piston 38. The connecting rod 37 can be considered kinetically as consisting of two separate masses: a reciprocating mass added to that of the piston 38 and a rotating mass added to that of crank 36. The inertia forces of the system can then be described as they relate to the reciprocating and the rotating masses, for each cylinder, generally as follows (see "Mechanical Vibrations," 2nd edition, by J. P. Den Hartog, published by McGraw Hill Book Company, 1940, Chapter V):

(1) The centrifugal force of the rotating mass exerts a rotating force on the engine frame through the main bearings. The amplitude of this force is a sinusoidal function at rotational frequency if considered in any one of the radial planes containing the axis of crank 36.

(2) The accelerations of the reciprocating mass exert inertia forces on the engine frame through the main bearings in the radial plane of the movement of the mass: i.e. the plane containing the axis of crank 36 and generally the center line of piston 38. The frequencies for these reciprocal inertia forces correspond to the rotational frequency of crank 36 and to twice said rotational frequency.

(3) The accelerations of the reciprocating mass also exert a torque on the crank 36 that reacts on the engine frame to produce a torque reaction in a transverse plane normal to the axis of crank 36 and effected at the main bearings for the crank and at the side of the cylinder against which piston 38 bears. The vibrations resulting from this torque reaction occur at one, two and three times the rotational frequency of crank 36.

(4) Additional vibrations arise from the operation of valve mechanism 39 which is driven from the engine crank shaft and which controls the inlet of fuel mixture to the cylinder and the exhaust of spent gases from the cylinder. These vibrations or reactions are generally in a transverse plane normal to the axis of crank 36 and at frequencies corresponding to the rotational frequency of the cam shaft of the valve mechanism and to harmonics of integer orders thereof. For a four cycle engine the vibrations caused by the valve mechanism 39 will be at approximately one-half the rotational frequency of crank 36.

(5) An additional torque vibration similar to that described under paragraph No. 3 above is caused by the varying gas pressure on top of piston 38, and generally occurs at a frequency corresponding to the rotational frequency of crank 36 and to harmonics of integer orders and, in the case of four cycle engines, also harmonics of ½ orders. This torque reaction changes with variations of the load on the engine.

The several forces just described are depicted in FIG. 7 as they occur in a multi-cylinder engine where the cylinders are arranged either in a single bank or in two banks of the V-type engine. The several forces resulting from each individual cylinder are all similar and can be algebraically combined and represented, for purposes of analysis, into three mutually perpendicular planes corresponding to an equivalent single cylinder with one set of the several forces as shown in FIG. 7. In this illustration the line Z—Z represents the axis of the crankshaft composed of a plurality of cranks 36; the line X—X is disposed at right angles to line Z—Z and represents the center line of a piston, so that the plane 40 shown as a rectangle bounded on two sides by lines Z—Z and X—X contains the axis of the crankshaft and the center lines of the several pistons; and line Y—Y is normal to both line Z—Z and line X—X to represent the horizontal transverse direction, so that the plane 41 shown as a rectangle bounded on two sides by lines X—X and Y—Y is normal to the axis of the crankshaft. The effect of the five sources of vibration described above as found in a multi-cylinder engine is shown as follows in FIG. 7:

(1) The rotating mass composed of the crankshaft gives rise to the revolving force 42 in some plane parallel to plane 41, and to an additional force couple 43 in a revolving radial plane containing axis Z—Z. Both force effects 42 and 43 are minimized by counterweighting of the cranks 36. The accuracy of counterweighting is limited in production and the remaining unbalance is measured and corrected for in accordance with the present invention.

(2) The combined reciprocating mass forces will be reduced to zero for single bank in-line cylinder arrangements if the individual reciprocating masses are suitably matched. If, however, the masses are not matched the combined forces will produce a couple 44 in plane 40 with resulting reciprocating forces 45 in this plane in the X—X direction at one and two times the rotational frequency of the crankshaft. For the V-type engine, the same forces will develop and if plane 40 bisects the angle between the two cylinder banks, the combined forces will produce the couple 44 in plane 40 and in addition thereto a couple 46 in plane 47 containing axis Z—Z and line Y—Y resulting in reciprocating forces 48 in the direction of line Y—Y. There normally will be an amplitude difference for these forces and couples in the two planes for the V-type engine.

(3) The combined inertia torque reactions produce a series of couples 49 acting in planes parallel to the plane 41 at one, two and three times the rotational frequency of the crankshaft.

(4) The combined inertia effects of the valve mechanism masses, as related to line D—D representing the axis of the cam shaft, to line P—P normal to line D—D and representing the direction of the reciprocating forces of the valve mechanism and to plane 50 containing lines D—D and P—P, will be: (a) a force and couple 51 acting radially from the D—D axis and produced by unsymmetrical mass distribution of the cam shaft at ½ the rotational frequency of the crankshaft for the usual four cycle engine; (b) a couple 52 in plane 50 and a force 53 in this plane in the P—P direction which is the direction of movement for the reciprocating parts of the valve mechanism; and (c) for valve in head engines, the combined inertia torque effects of the rocker arms is a series of couples 54 acting in planes parallel to plane 41, at ½ the rotational frequency of the crankshaft and also integer and ½ order harmonics.

(5) The combined gas pressure torque effect is a series of couples 55 acting in planes parallel to plane 41 at ½ the rotational frequency of the crankshaft and also integer and ½ order harmonics, for a four cycle engine.

Where the engine is suspended seismically as illustrated in FIGS. 1 to 3 there is a definite freedom for all of these vibrations to occur and it becomes necessary to filter out the extraneous vibrations so that the vibrations resulting from forces 42 and 43 can be measured and corrected for. Each of the considered forces and couples acting on the engine frame as it is freely supported gives the frame a complex vibratory motion with the total of all the forces and couples adding to the complexity. This complex motion is illustrated in FIG. 8 where the engine is shown as a block suspended seismically from the connection point 7.

The geometry of the engine for illustrating purposes, is such that the center of gravity 56 is offset from the crank axis Z—Z and from the X—Z plane corresponding to plane 40 and the Y—Z plane corresponding to plane 47 of FIG. 7. The principal longitudinal inertia axis A—A of the engine, containing center of gravity 56, is at angles $\theta_{xz}$ and $\theta_{yz}$ with respect to planes X—Z and Y—Z, respectively. The other two principal inertia axes are B—B and C—C at right angles to axis A—A and to each other.

Considering only the oscillating couple 49 acting in plane X—Y corresponding to plane 41, the engines is thereby caused to oscillate about the principal inertia axis A—A. However, since A—A is not perpendicular to plane X—Y, there will also be a component of couple 49 about axes B—B and C—C causing oscillation of the engine about these axes. The effect on the engine of the other forces and couples can be shown similarly to provide a total vibratory motion for any given point on the engine which constitutes a summation of all of the separate motions produced.

The resulting complex motions for the engine may be modified by a mechanical filtering arrangement to make it possible to determine only the effect of vibrations resulting from forces 42 and 43, which are the ones produced by unbalance of the rotary crankshaft and its rotary attachments, and in the case of V-type engines the additional forces 46 and 48.

One way to accomplish this is to add an inertia mass 78 to the engine as an integral or separately added part of the frame 13 which is locked to the engine by movement of the hand lever 21 and forms a part thereof during the unbalance testing, as previously described. The mass 78 is secured in accordance with the previous analysis of the inertia axis, as shown in FIG. 8 at a location that will bring the inertia axis A—A into the position A'—A' which is parallel to Z—Z, and inertia axis B—B into position B'—B' which is parallel to Y—Y, and inertia axis C—C into the position C'—C' which is parallel to X—X. When this is done, the oscillating couple 49 will act only about the A'—A' axis and will rock the engine only about that axis and in plane X—Y. The effect on the engine of the other forces and couples can be shown similarly simplified.

By placing the two unidirectional vibration pickups 14 and 15 in the plane established by A'—A' and B'—B' with the pickups spaced in the direction of axis A'—A' and their direction of vibration sensitivity perpendicular to the axis A'—A', the pickups will be sensitive only to an oscillation about the C'—C' axis and to a translation of the A'—A' axis in the B'—B' direction, thereby indicating only the effect of unbalance forces 42 and 43, and in the case of V-type engines the additional forces 46 and 48.

Reviewing the effects of the various sources of vibration will show:

(1) Forces 42 and 43 will cause the engine to oscillate about axis C'—C' and cause the A'—A' axis to have a circular motion. The vibration pickups 14 and 15 will be sensitive to both of these motions.

(2) Forces 44 and 45 in plane X—Z will cause the engine to translate in the C'—C' direction and to oscillate about the A'—A' and B'—B' axes, which motions are ignored by the pickups 14 and 15, except as they result in components in the directions of forces 46 and 48 in the V-type engine.

(3) Couple 49 will cause oscillation about axis A'—A' and will be ignored by pickups 14 and 15.

(4) Forces 51 will produce motion about axis C'—C' and a circular motion of the A'—A' axis, However, previous balancing of the cam shaft will reduce these motions to a minimum so that their effect upon the pickups 14 and 15 will be negligible. For four cycle engines the ½ crank rotational frequency of these motions can be filtered out electrically.

(5) Forces 52 and 53 in a plane parallel to plane X—Z will cause the engine to translate in the C'—C' direction and to oscillate about the A'—A' and B'—B' axes, which motions are ignored by the pickups 14 and 15.

(6) The force couple 54 lies in plane X—Y causing oscillation about the axis A'—A' and will be ignored by pickups 14 and 15.

(7) Force couples 55 will oscillate the engine about the A'—A' axis, and therefore will have no effect upon the pickups 14 and 15.

In summary, the vibration pickups 14 and 15 will only be responsive to vibrations produced by forces 42 and 43 which represent the unbalance of the rotary parts of the engine, and additionally to the forces 46 and 48 in the case of a V-type engine. The values determined by the pickups for these vibrations can then be used to correct for unbalance.

In the case of the multi-bank engine such as the V-type engine, it is desirable to eliminate vibration in one radial plane containing the crank axis. When the pickups 14 and 15 are disposed, as shown, they will be sensitive to forces 46 and 48 and will indicate the necessary modification of the rotating mass of the crankshaft to eliminate vibration in the Y—Z plane. If it is desired to eliminate the vibrations in the X—Z plane, the pickups may be disposed to be sensitive to forces 44 and 45 to thereby indicate the necessary modification of rotating mass.

Another means of mechanically filtering out the extraneous vibrations so that the pickups 14 and 15 only measure the vibrations resulting from unbalance of the rotary parts, represented by forces 42 and 43, is to mount the engine so that it is free to oscillate about the X—X vertical axis and to translate horizontally in the direction of the Z—Z and Y—Y axes, but is restricted against movement in other directions. In the case of a V-type engine the pick-ups 14 and 15 will additionally respond to vibration forces 46 and 48. This filtering can be accomplished as shown in FIG. 9, by suspending the engine 1 at its four corners on rods 57 that are relatively stiff in the vertical X—X direction and are flexible to permit motion in both the Z—Z and Y—Y directions and rotation about the X—X axis. By placing the two unidirectional vibration pickups 14 and 15 a reasonable distance apart in any horizontal plane with their direction of sensitivity perpendicular to the vertical plane containing the crankshaft axis Z—Z, it is possible to indicate only the effect of forces 42 and 43 and to avoid pickup of vibrations due to extraneous forces such as the forces and couples 44, 49, 51, 52, 54 and 55. In the case of the V-type engine it is understood that the small forces 46 and 48 are measured along with 42 and 43 and that the correction for rotary unbalance will in effect reduce the vibrations from 46 and 48 in the horizontal direction of pickups 14 and 15 to zero while increasing the reciprocating vibrations in other planes including the vertical plane of axis X—X. This makes a smooth running engine in the lateral direction which appears to be acceptable in the automobile industry, for instance.

The electrical output from pickups 14 and 15, in all cases, is filtered, amplified and then measured either conventionally or by means such as that illustrated in FIG. 5, wherein plane separation is provided for.

After the operator has secured the pickups 14 and 15 to the engine 1 as previously described, he connects tachometer leads 58 to the engine ignition system and speeds the engine to a point where the tachometer 59 in cabinet 11 indicates a satisfactory engine speed which may be from 1800 to 2000 revolutions per minute, and should be substantially above the natural frequency for each mode of vibration permitted by the mounting.

The operator then presses button 60 to close switch contacts 61 connecting the two pick-ups 14 and 15 to the network 62 for determining unbalance in the front plane, i.e. the plane of fan belt wheel 3.

The button 60 also closes switch 63 connecting the output of network 62 to the filter 64 and from there to the amplifier 65.

The button 60 also closes switch 66 connecting the output of amplifier 65 to the front plane weighing meter 67 which holds its position for indicating the amount of unbalance measured for the front plane and shown in terms of the correction needed. At the same time, the amplifier 65 energizes the stroboscope light 68 which is carried on a pivotal arm 69 on the end of table 10 and which is raised to operative position by the operator and secured there by a thumb screw or other means.

The filter 64 should be adjusted to filter out all electrical pulses other than those occurring at the frequencies of the vibrations due to unbalance of the rotating assembly of the engine. Force 51 should be filtered out at filter 64.

Markings, as of a circumferential number scale on wheel 3, will cooperate with the strobe light 68 to indicate to the operator the angle for correction of unbalance to be applied in the fan belt wheel 3.

The operator then releases button 60 and presses button 70 to close switch contacts 71 and thereby connect the pick-ups 14 and 15 to the network 72 for determining unbalance in the rear plane, i.e. the plane of flywheel 4.

The button 70 also closes switch 73 connecting the output of network 72 to the filter 64 and from there to the amplifier 65.

The button 70 also closes a switch 74 connecting the output of amplifier 65 to the rear plane weighing meter 75 which holds its position for indicating the amount of unbalance measured for the rear plane and shown in terms of the correction needed.

The operator then notes the stroboscope reading for angle of unbalance and the reading of meters 67 and 75. The meters 67 and 75 are calibrated to read directly in terms of the method of correction to be used. He then stops the engine and makes the indicated corrections by either adding or removing metal to or from the belt wheel 3 and the flywheel 4.

For the engine illustrated both the belt wheel 3 and the flywheel 4 have a series of circumferentially spaced holes 76 therein for selectively receiving metal slugs 77 for effecting the desired balancing of the engine. Both static and dynamic balancing may be accomplished for the crankshaft assembly of the engine.

The invention has been illustrated as employing manual control throughout. It is, of course, adaptable to various automatic controls as may be desired.

Various modes of carrying out the invention are contemplated as being within the scope of the following claims particularly pointing out and distinctly claiming the subject matter which is regarded as the invention.

We claim:

Apparatus for determining the unbalance of the rotating assembly of an internal-combustion engine during operation of the engine, comprising means to support the engine seismically, unidirectional pickup means connected to the engine and disposed to pick up engine vibrations occurring in a plane parallel to the rotational axis of the assembly to be balanced and containing the principal inertia axis of the engine, means to adjust the engine mass to establish said principal inertia axis thereof parallel to said rotational axis to eliminate pickup of torque vibrations of the engine otherwise occurring about the principal inertia axis of the engine, said pickup means including means to translate substantially all vibrations received thereby into electrical pulses and having an output circuit, means in said output circuit to filter out substantially all frequencies of electrical pulses other than those occurring once per revolution of said rotating assembly, means in said output circuit to amplify the electrical pulses passing said filter and arising substantially completely from the unbalance of the rotating assembly, and means to determine the amount and angular location of unbalance of said rotating assembly from said amplified electrical pulses.

References Cited in the file of this patent

UNITED STATES PATENTS

| | | |
|---|---|---|
| 2,192,963 | Hetzel et al. | Mar. 5, 1940 |
| 2,291,045 | Lancor | July 28, 1942 |
| 2,362,842 | Mueller | Nov. 14, 1944 |
| 2,451,863 | Oakley | Oct. 19, 1948 |
| 2,486,896 | Weaver et al. | Nov. 1, 1949 |
| 2,867,766 | Broder et al. | Jan. 6, 1959 |

FOREIGN PATENTS

| | | |
|---|---|---|
| 681,044 | Great Britain | Oct. 15, 1952 |

OTHER REFERENCES

Pages 301–306, Aircraft Power Plants by Fraas, a text book published by McGraw-Hill Book Co. in 1943. A copy is available in Division 36, U.S. Patent Office.